United States Patent [19]
Miller

[11] Patent Number: 5,268,977
[45] Date of Patent: Dec. 7, 1993

[54] FIBER OPTIC ZOOM-AND-DIM PIN-SPOT LUMINAIRE

[76] Inventor: Jack V. Miller, 700 N. Auburn Ave., Sierra Madre, Calif. 91024

[21] Appl. No.: 908,388

[22] Filed: Jul. 6, 1992

[51] Int. Cl.⁵ .............................. G02B 6/00; G02B 6/36
[52] U.S. Cl. ........................................ 385/33; 362/32; 362/336
[58] Field of Search ............... 359/619, 626, 741, 742, 359/743; 362/12, 32, 268, 333, 334, 336; 385/32, 33

[56] References Cited

U.S. PATENT DOCUMENTS

| | | | |
|---|---|---|---|
| 1,495,521 | 5/1924 | Kopp | 362/334 |
| 2,887,568 | 5/1959 | Franck | 362/336 |
| 4,815,807 | 3/1989 | Kaneko et al. | 385/33 |
| 4,821,114 | 4/1989 | Gebhardt | 385/119 X |
| 4,953,549 | 9/1990 | Mori | 362/32 X |

*Primary Examiner*—Akm E. Ullah

[57] ABSTRACT

A fiber optic zoom-and-dim pins-pot luminaire includes a tubular housing having a proximal end and a distal end having a composite macro lens on an optical axis. A light emitter slidably disposed in a support tube at the proximal end of the housing is a fiber optic light guide having a first end accepting light from a remote source of illumination and a second emitting light on the optical axis. The composite macro lens forms a principal focus at a first focal plane to produce a narrow beam. The macro lens includes a plurality of micro lenses contiguous with portions of the macro lens, each micro lens having a focus at a second focal plane axially displaced from the principal focus of the macro lens. The luminaire is zoomed to a progressively wider beam of uniform intensity by moving the light emitter along the optical axis from the first focal plane, at which the second focal plane is out of focus; to the second focal plane, at which the first focal plane is out of focus. By retracting the light emitter into the support tube, the light may be dimmed at any position in the zoom range, or may be zoomed to another beam width at any desired brightness.

20 Claims, 1 Drawing Sheet

FIBER OPTIC ZOOM-AND-DIM PIN-SPOT LUMINAIRE

BACKGROUND OF THE INVENTION

This invention applies to the field of fiber optics, and more particularly to narrow-beam spotlight luminaires, known as "pinspot" or "follow-spot" lights that produce a well collimated distribution of light with virtually no light outside an intense central beam; and wherein the beam may be zoomed to larger diameters.

Presently known fiber optic light spotlights normally use a collimating lens with the emitting end of the light guide at the focus of the lens. The emitted beam from the fiber optics light guide has a wide photometric distribution exceeding a 70° included conical angle. In order to intercept all the emitted rays from the light guide, the lens must be very large in diameter and have a very short focal length. This produces a beam having a very sharp and harsh image of the individual fiber ends, interstices and discontinuities of the fiber optic light guide. The extreme degree of refraction of a simple short focal length lens produces a halo of chromatic aberration around the projected beam. In prior art lighting applications these characteristics are aesthetically objectionable, but there are no available alternatives.

Zooming of presently-known fiber optics spotlights is very limited, in that movement of the light source away from the focal plane of the lens produces a hollow beam with a dark spot in the center. Although this could be overcome with multiple, differentially-moved lenses (as in camera zoom lenses) that structure is too complex and costly for lighting purposes. Dimming of a zoom fiber optics spotlight is presently believed to be unknown in the prior art.

The primary purpose of the present invention is to provide a fiber optic light guide luminaire having narrow-beam zoomable to a uniformly illuminated wide beam; using a simple, inexpensive lens, in which the beam is free of a harsh edges, fiber images and chromatic aberrations; and which may be dimmed over the full range of zoomed beam widths.

SUMMARY OF THE INVENTION

The achievement of the foregoing purposes of the invention is accomplished by the present invention in which a zoomable fiber optic pinspot luminaire includes a generally cylindrical tubular housing having a proximal end, a distal end and an optical axis therethrough. A light emitter in the luminaire includes an elongated fiber optic light guide having a first end accepting light from a remote source of illumination and a second end emitting light on the optical axis at the proximal end of the housing. Light from the light emitting means is refracted through a composite macro lens on the optical axis at the distal end of the housing. The macro lens has a principal focus at the light emitting means and at least one surface of the macro lens also includes a plurality of micro lenses forming another focus axially displaced from the focus of the macro lens. The light emitter is slidably positioned in a substantially non-reflective support tube, wherein retraction of the light emitter into the support tube dims the emitted light, and hence dims the light beam of the luminaire at any position in the zoom range.

In the preferred embodiment the macro lens has a ratio of focal-length to aperture-diameter of f:1.5 or less and the micro lenses have a ratio of focal-length to aperture-diameter diameter of f:100 or more. The preferred embodiment macro lens has a convex distal surface and a planar proximal surface; and the micro lenses have distal surfaces contiguous with the proximal surface of the macro lens and have convex proximal surfaces. The macro lens forms a focus in a first focal plane and the micro lenses form a focus in one or more focal planes displaced from the first focal plane.

In operation the light emitting means is movable along the optical axis between the focal planes. The multiple focal plane system softens the edges of the projected light beam, eliminates the images of individual fibers in a fiber optic light guide; and blends out any flaws or interstices in the emitting end of the light guide. Luminaires constructed according to the invention have demonstrated zoom ranges exceeding 5:1 beam diameter ratios, and dimming of at least 10:1 in beam intensity at any point in the zoom range.

DETAILED DESCRIPTION OF THE DRAWINGS

Figure 1:
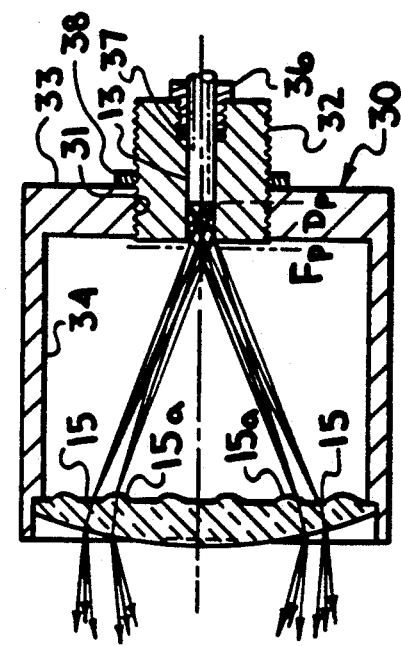
FIG. 1 is a side cross-sectional view of a typical prior art fiber optic spotlight luminaire, having a light-emitter at the end of a fiber optic light guide at the focal plane of a collimating lens.

In FIG. 1 a typical prior art fiber optic spotlight luminaire 1 is shown having a light-emitter 2 at the end of a fiber optic light guide 3 at focal plane Fp of a collimating lens 5. Light rays 6, which subtend an included small angle across the width of emitter 2, are refracted by collimating lens 5 into generally collimated narrow beam rays 7 having a divergence angle equal to the included angle of rays 6 across the width of emitter 6. The prior art use of a simple and inexpensive collimating lenses produce beams having sharp, harsh edges which include chromatic aberrations; and projecting images of the light emitters, which are usually a bundle of bright fiber ends with dark interstices, along with the uneven results of cutting and polishing.

Figure 2:
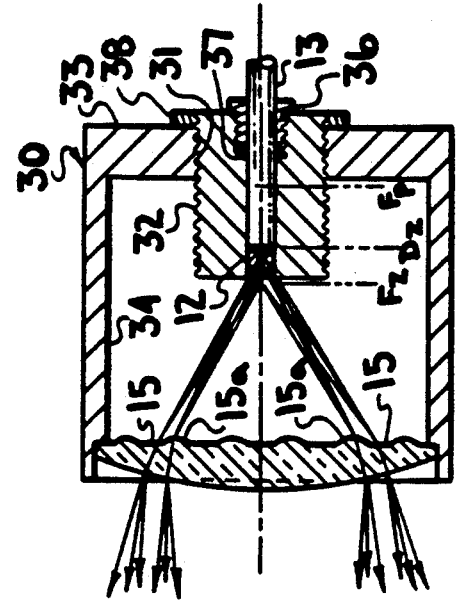
FIG. 2 is a side cross-sectional view of the prior art luminaire of FIG. 1 with the light emitter moved out of the focal plane of the collimating lens.

In FIG. 2 the typical prior art luminaire 1 of FIG. 1 is shown with the light emitter 2 moved out of the narrow-beam focal plane Fp of the collimating lens to a wide focus zoom position Fz. Since the light emitter image is at a shorter distance from the lens than at the collimation focal plane Fp, light rays 6a are no longer refracted into collimation by lens 5, but are conically divergent rays 7a. Further, the closer proximity of the light emitter to the lens produces a greaterincluded angle of the emitter and a wider beam distribution. However, instead of zooming to a wide beam of uniform intensity, the divergent rays 7a produce a wide conical beam with a dark hole in the center.

Figure 3:
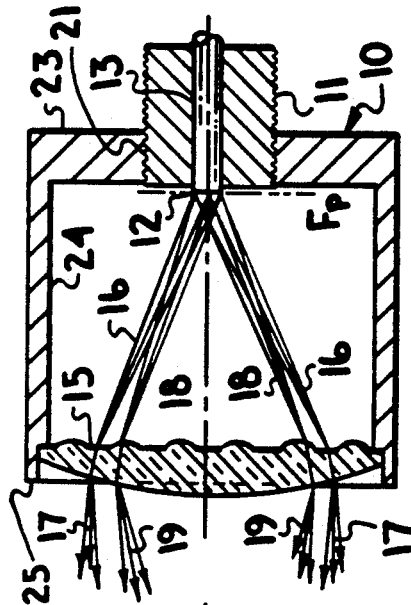
FIG. 3 is a side cross-sectional view of a fiber optic pinspot luminaire according to the present invention, producing a narrow beam with the light emitter at the focal plane of a macro lens which includes a plurality of micro lenses.

In FIG. 3 the side cross-sectional view of a fiber optic pinspot luminaire 10 is shown, according to the present invention, producing a narrow and generally collimated beam. Light emitter 12 is disposed on an optical axis at the focal plane Fp of a composite macro lens 15, preferably having a focal-length to aperture-diameter of f:1.5 or less; and including a plurality of micro lenses 15a, preferably having a ratio of focal-length to aperture-diameter diameter of f:100 or more. A preferred embodiment of the composite macro lens is plano-convex, with contiguous convex micro lenses in the planar surface of the macro lens. For clarity of illustration the micro lenses are illustrated as larger than used in practice, wherein micro lenses having diameters from 0.1 mm to 1 mm function properly. Light emitter 12 is supported by a light guide 13 within a support tube 11, which is in turn slidably disposed within a hole 21 in the proximal wall 23 of a generally tubular housing 24; and macro lens 15 is supported in the distal end 25 of housing 24. Light rays 16, which subtend an included small angle across the width of emitter 12, are substantially collimated by macro lens 15 into narrow beam rays 17 having a divergence angle equal to the included angle of rays 16 subtended across the width of emitter 12. Light rays 18, which also subtend an included small angle across the width of emitter 12, are refracted by shorter focal length micro lenses 15a into rays 17a having a converging conical distribution and also a divergence angle approximately equal to the included angle of rays 16 across the width of emitter 16. The converging distribution of rays 17a tend to project a slightly conical coaxial beam superimposed on the beam projected by collimated rays 17, producing a generally collimated, narrow beam of light without sharp, harsh edges, chromatic aberrations or an image of the light emitter.

Figure 4:
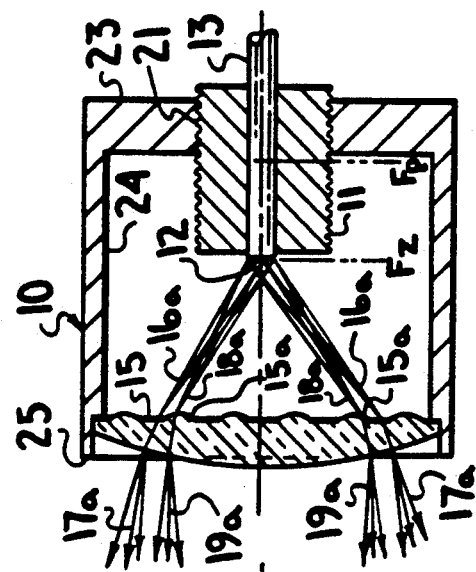
FIG. 4 is a side cross-sectional view of a fiber optic pinspot luminaire of FIG. 3, shown with the light emitter zoomed to a wide beam at focal plane of the micro lenses.

In FIG. 4 the side cross-sectional view of a fiber optic pinspot luminaire 10 of FIG. 3 is shown, according to the present invention, producing a wide beam. Light emitter 12 is supported by light guide 13, disposed within a support tube 11, which is in turn slidably disposed within a hole 21 within the proximal wall 23 of generally tubular housing 24. Light emitter 12 is moved out of focal plane Fp of the collimating macro lens 15 to a focus zoom position Fz, which is the focal plane of a plurality of integral micro lenses 15a. Since the light emitter image is at a shorter distance from the macro lens than the collimation focal plane Fp, the divergence angle subtended across the light emitter is greater. Also, light rays 16a are no longer refracted into collimation by lens 15, as in FIG. 3, but are conically divergent rays 17a. Light rays 18a are refracted by micro lenses 15a into rays 19a having a substantially collimated distribution and also a divergence angle equal to the included angle of rays 16 across the width of emitter 12. The conical distribution of rays 17a tend to project a conical beam superimposed on the collimated beam projected by rays 19a. The diverging distribution of rays 17a project a wide conical beam which would normally tend to produce a dark hole in the center. Superimposed on the wide conical beam projected by rays 17a is the generally collimated beam formed by rays 19a. The collimated beam then fills in the dark hole in the conical beam, producing a wide beam of light without sharp, harsh edges, chromatic aberrations or emitter image.

Figure 5:
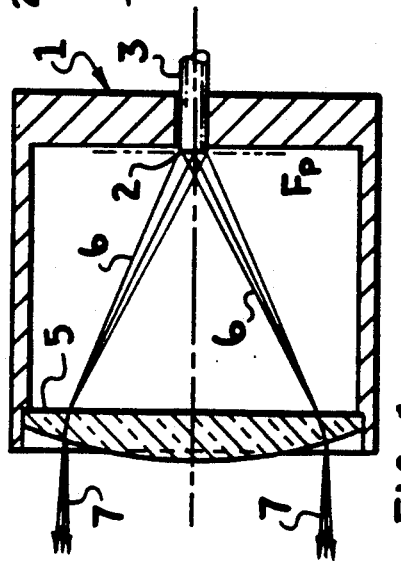
FIG. 5 is a side cross-sectional view of a preferred embodiment of a fiber optic pinspot luminaire according to the present invention, showing a dimmed narrow beam.

In FIG. 5 a side cross-sectional view of a preferred embodiment fiber optic luminaire 30 is shown, producing a dimmed, narrow, collimated beam. Light emitter 12 of light guide 13 is retracted in the proximal direction into support tube 32, away from focal plane Fp to a dimmed plane Dp. Support tube 32, being made of a substantially non-reflective material, absorbs progressively more illumination from light emitter 12 as emitter 12 is retracted a greater distance from focal plan Fp, whereby the brightness of the generally collimated beam of the luminaire is adjustable by the axial position of light emitter 12 within support tube 32. In order to lock the adjusted brightness, a compression fitting 36 frictionally loads an elastomeric ring 37 against the light guide 13. In order to adjust and lock the zoom position, support tube 32 is threadably engaged into a threaded hole 31 in proximal wall 33 of housing 34 and locked at the desired axial position by a nut 38.

Figure 6:
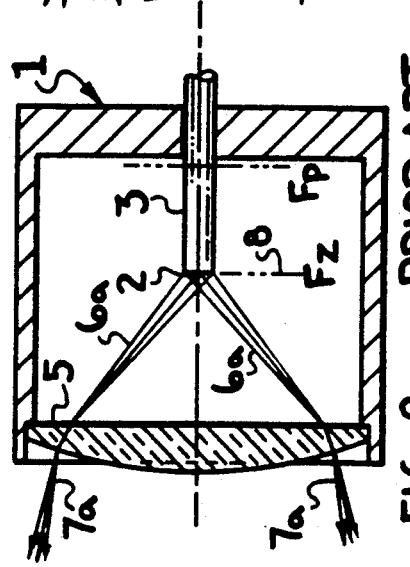
FIG. 6 is a side cross-sectional view of a fiber optic pinspot luminaire of FIG. 5, showing a dimmed wide beam.

In FIG. 6 a side cross-sectional view of the fiber optic 30 of FIG. 5 is shown, producing a dimmed wide beam. Light emitter 12 of light guide 13 is retracted in the proximal direction into support tube 32, away from wide zoom focal plane Fz to a dimmed zoom plane Dz. Support tube 32, being made of a substantially non-reflective material, absorbs progressively more illumination from light emitter 12 as it is retracted a greater distance from zoom focal plane Fz, whereby the brightness of the wide beam of the luminaire is adjustable by the axial position of light emitter 12 within support tube 32.

The purposes of the present invention are achieved by the embodiments of the fiber optic zoom-and-dim pin-spot luminaire invention described herein. Zoom ratios exceeding 5:1 have been found to be feasible using simple and inexpensive plastic lenses, with beams of uniform intensity and no aberrations or visual discontinuities at any beam width in the zoom range. Also, 10:1 dimming ratios have been demonstrated at any point in the zoom range, and zooming over the full zoom range can be accomplished at a pre-adjusted and fixed dimming level.

I claim:

1. A fiber optic pinspot luminaire having a zoom-and-dim beam including:
    a generally cylindrical tubular housing having a proximal end, a distal end and an optical axis therethrough;
    a composite lens in the configuration of a macro lens on the optical axis at the distal end of the housing, said macro lens having a principal focus in a first focal plane and a plurality of micro lenses, each micro lens having a lens surface contiguous with a lens surface of the macro lens and forming a focus in a second focal plane;
    a light emitter support tube disposed on the optical axis in the proximal end of the housing and having a distal end at a focal plane of the composite lens and a proximal end; and
    a light emitter emitting light on the optical axis and slidably disposed in the support tube, said light emitter emitting light from an elongated fiber optic light guide connected to a remote source of illumination, said light emitter being positionable along the optical axis to zoom the beam and retractable into the support tube to dim the beam.

2. A fiber optic luminaire according to claim 1 in which the macro lens has a ratio of focal-length to lens-aperture-diameter of f:1.5 or less and the micro lenses have a ratio of focal-length to lens-aperture-diameter of f:100 or more.

3. A fiber optic luminaire according to claim 1 in which the macro lens has a convex distal surface and the micro lenses have convex proximal surfaces.

4. A fiber optic luminaire according to claim 1 in which the macro lens has a convex distal surface and a planar proximal surface and the micro lenses have planar distal surfaces contiguous with the proximal surface of the macro lens and have convex proximal surfaces.

5. A fiber optic uminaire according to claim 1 in which the plurality of micro lenses have a plurality of focal planes displaced from the macro lens focal plane.

6. A fiber optic luminaire according to claim 1 in which the light emitter support tube has a means for locking the light emitter from axial movement.

7. A fiber optic luminaire having a zoom beam including:
   an optical system in the luminaire having a proximal end, a distal end and an optical axis therethrough;
   a macro lens on the optical axis at the distal end of the luminaire said macro lens having a principal focus in a first focal plane and a plurality of micro lenses on the optical axis, each micro lens forming a focus axially spaced from the first focal plane.
   a light emitter emitting light from an elongated fiber optic light guide connected to a remote source of illumination, the light emitter being positionable along the optical axis.

8. A fiber optic luminaire according to claim 7 in which the macro lens has a ratio of focal length to lens aperture diameter of f:1.5 or less and the micro lenses have a ratio of focal length to lens aperture diameter of f:100 or more.

9. A fiber optic luminaire according to claim 7 in which the macro lens has a convex distal surface and the micro lenses have proximal convex surfaces.

10. A fiber optic luminaire according to claim 7 in which the macro lens has a convex distal surface and a planar proximal surface and the micro lenses have planar distal surfaces contiguous with the proximal surface of the macro lens, said micro lenses having convex proximal surfaces.

11. A fiber luminaire according to claim 7 in which the light emitter support tube has a means for locking the light emitter from axial movement.

12. A fiber luminaire according to claim 7 in which the light emitter support tube is threadably engaged into the proximal end of the luminaire.

13. A fiber luminaire according to claim 7 in which the light emitter support tube is threadably engaged for axial adjustment at the proximal end of the luminaire and has a lock nut means for precluding axial movement after adjustment.

14. A fiber luminaire according to claim 7 in which the light emitter support tube is substantially non-reflective.

15. A fiber optic pinspot luminaire having a zoom beam including:
   a generally cylindrical tubular housing having a proximal end, a distal end and an optical axis therethrough;
   a composite lens in the configuration of a macro lens on the optical axis at the distal end of the housing, said macro lens having a principal focus in a first focal plane and a plurality of micro lenses, each micro lens having a lens surface contiguous with a lens surface of the macro lens and forming a focus in a second focal plane;
   a light emitter support tube disposed on the optical axis in the proximal end of the housing and having a distal end at a focal plane of the composite lens and a proximal end; and
   a light emitter emitting light on the optical axis and slidably disposed in the support tube, said light emitter emitting light from an elongated fiber optic light guide connected to a remote source of illumination, the light emitter being positionable along the optical axis to zoom the beam.

16. A fiber optic luminaire according to claim 15 in which the macro lens has a ratio of focal length to lens aperture diameter of f:1.5 or less and the micro lenses have a ratio of focal length to lens aperture diameter of f:100 or more.

17. A fiber optic luminaire according to claim 15 in which the macro lens has a convex distal surface and the micro lenses have convex proximal surfaces.

18. A fiber optic luminaire according to claim 15 in which the macro lens has a convex distal surface and a planar proximal surface and the micro lenses have distal surfaces contiguous with the proximal surface of the macro lens and have convex proximal surfaces.

19. A fiber optic luminaire according to claim 15 in which the plurality of micro lenses have focal planes displaced from the macro lens focal plane.

20. A fiber optic luminaire according to claim 15 in which the light emitter support tube has a means for locking the light emitter from axial movement.

* * * * *